United States Patent [19]
Sato

[11] Patent Number: 6,057,942
[45] Date of Patent: *May 2, 2000

[54] IMAGE PROCESSING APPARATUS MODIFYING A CONNECTION CONDITION TO A COMMUNICATION LINE BASED UPON TYPE OF IMAGE RECEIVED

[75] Inventor: Jun Sato, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/730,451

[22] Filed: Oct. 15, 1996

[30] Foreign Application Priority Data

Mar. 14, 1996 [JP] Japan .................................. 8-057336

[51] Int. Cl.⁷ ...................................................... H04N 1/32
[52] U.S. Cl. ........................ 358/435; 358/439; 358/442; 358/434
[58] Field of Search .................................. 358/434–436, 358/438–440, 442, 462, 468, 500, 529; 382/187; 395/200.1, 200.11, 200.12, 117, 1.18; H04N 1/32

[56] References Cited

U.S. PATENT DOCUMENTS

| | | | |
|---|---|---|---|
| 5,355,230 | 10/1994 | Kaneko | 358/434 |
| 5,361,144 | 11/1994 | Sugiura | 358/500 |
| 5,455,687 | 10/1995 | Fukui et al. | 358/434 |
| 5,485,282 | 1/1996 | Takeda | 358/434 |
| 5,539,529 | 7/1996 | Merchant | 358/462 |

FOREIGN PATENT DOCUMENTS 58-62764  4/1983  Japan .
1-305485  12/1989  Japan .

Primary Examiner—Kim Yen Vu
Attorney, Agent, or Firm—Staas & Halsey LLP

[57] ABSTRACT

An image processing apparatus overcomes deterioration of performance in a FAX image information receiving process by disconnecting an unwanted transmission line. The image processing apparatus overcomes deterioration in a character recognition process due to noise on the line, when recognizing characters from image information input via a transmission line. The image processing apparatus includes an identifying unit identifying a type of image information input via the transmission line, and a modifying unit modifying connecting conditions for the transmission line on the basis of the identification result from the identifying unit.

20 Claims, 14 Drawing Sheets

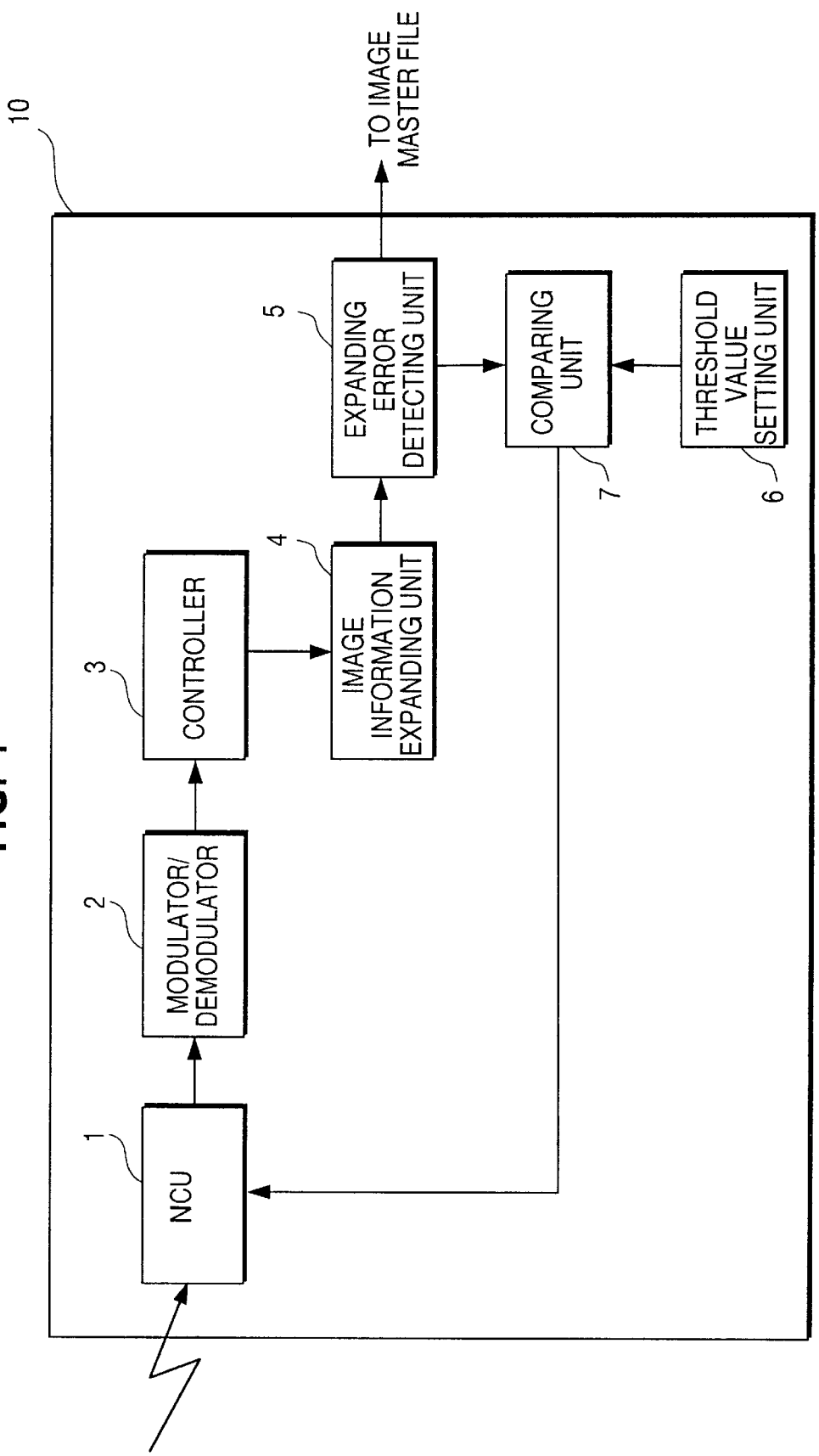

IMAGE PROCESSING APPARATUS MODIFYING A CONNECTION CONDITION TO A COMMUNICATION LINE BASED UPON TYPE OF IMAGE RECEIVED

BACKGROUND OF THE INVENTION

1. Field of the Invention

The present invention relates to an image processing apparatus executing recognition processing of characters or other data from image information received from a transmission line.

2. Description of the Related Art

Facsimile (hereinafter referred to as FAX) apparatuses have been spread widely as information terminals. Fax has been used in offices and shops as part of an information network to establish an order receiving and issuing process has been implemented using a FAX line between a terminal installed in a shop and a host computer.

The order receiving and issuing process is realized by receiving FAX image information such as an order issuing slip, etc., from a shop using a FAX apparatus installed in the host computer side and then recognizing character patterns in the FAX image information with a character recognizing apparatus (hereinafter referred to as optical character recognition, or OCR). The off-line type FAX-OCR system has been widely used. In the off-line type FAX-OCR system, the FAX image information received from a shop is output once to the receiving recording sheet in the host computer side and then the output receiving recording sheet is manually input to the OCR for the purpose of order receiving and issuing work.

However, with continuous progress in the versatility of the information network system and the rapid expansion in the amount of information to be processed, improvement in the processing rate of information is now required. Particularly, to attain high efficiency of order receiving and issuing work and reduction of personal cost, the existing off-line type FAX-OCR system is quickly being replaced by an on-line type FAX-OCR system. In the on-line type FAX-OCR system, the image information received by FAX is sent directly to the OCR for recognition, without passing through the receiving recording sheet.

In the image processing apparatus (hereinafter referred to as FAX-OCR apparatus) which generally recognizes character patterns in the image information received by FAX with OCR of the image information received by FAX applied by the FAX apparatus, if a code error is generated due to noise, etc. on the line while the image information is being received, the image information received by FAX may include a line error. Accordingly, a disturbance in the image obtained by encoding the image information received by FAX is generated.

FIG. 1 is a block diagram illustrating a FAX input controller 10 of the FAX-OCR apparatus of the related art. FIG. 2 is a diagram explaining disturbance in an image due to a line error. The receiving process of the FAX image input from the communication line will be explained with reference to FIGS. 1 and 2.

Referring now to FIG. 1, an analog signal carrying image data and communication sequence data is received by a network control unit (hereinafter referred to as NCU) 1 from a network control line (not shown in FIG. 1). After the analog signal is demodulated into a digital signal in the modulator/demodulator 2, an image data part of the digital signal is transmitted to an image information expanding unit 4 from a controller 3; the communication sequence data part other than the image data is used as a control signal for controlling the modulator/demodulator 2.

The digital image data includes the data obtained by encoding a continuous length (hereinafter referred to as run-length encoding) of black pixels or white pixels for every scanning line and the data obtained by adding, after the above-mentioned data, the end of line (hereinafter referred to as EOL) code indicating the end of each scanning line.

The controller 3 detects the EOL from the digital image data, transmits the image data to the image information expanding unit 4 in units of each scanning line and instructs the image information expanding unit 4 to begin the expanding process of data. The image information expanding unit 4, having received the instruction for the data expanding process, executes the expanding process on the image data in units of each scanning line.

For example, if the digital image data for one scanning line is assumed to be "01 11001110001110011", the image data can be divided (beginning with the left side of the foregoing digital sequence) into five code words of (1) "0111", (2) "0011", (3) "1000", (4) "11" and (5) "10011"; respective code words are encoded by the run-length encoding method to mean that (1) "continuous white pixels indicate 2", (2) "continuous black pixels indicate 5", (3) "continuous white pixels indicate 3", (4) "continuous black pixels indicate 2" and (5) "continuous white pixels indicate 8".

When this image data is expanded, image data consisting of 20 pixels as shown in FIG. 2(A) is obtained, and thus has the same length (L) as the scanning line when the expanding process is executed normally.

However, the second code word, "0011" in the digital image data may be "0010" due to an error caused by the line noise. If the erroneous second code word "0010" means that "continuous black pixels indicate 6" by the run-length encoding, when the foregoing image data (which includes the above-mentioned erroneous second code word) is expanded, an image consisting of 21 pixels is obtained, as shown in FIG. 2(B).

Therefore, since the length of the expanded image data does not match the length of the scanning line, an expansion error is detected by the expansion error detecting unit 5. The scanning line data, including the foregoing error, is therefore replaced with the preceding scanning line data. However, when this replacement is performed, the horizontal line disappears, resulting in an inaccurate representation of, and a disturbance of, the image.

Particularly when the above-mentioned image inaccurate representation is generated, in the character pattern or at an area near the character pattern which is the object of the character recognizing processing, erroneous recognition occurs since the expansion error detecting unit 5 detects for each scanning line whether image expansion has been performed normally or not.

If image expansion is not carried out correctly, the number of expansion errors is counted.

The comparing unit 7 determines whether the number of errors counted by the expansion error detecting unit 5 exceeds a threshold value preset in the threshold value setting unit 6 (for example, the number of scanning lines corresponding to two percent of the number of scanning lines of a page). If the number of errors counted by the expansion error detecting unit exceeds the threshold, the image is considered to have poor reproducibility which can easily generate erroneous recognition. In the foregoing event, the comparing unit 7 issues an instruction to disconnect forcibly the line to the NCU 1.

As explained above, a problem in the FAX-OCR apparatus of the related art is that the line is forcibly disconnected depending on whether the number of scanning lines generating an expansion error has exceeded the fixed threshold value, in order to reduce a drop in the character recognition efficiency due to line noise.

However, with the increasing versatility of information network systems, not all image information received is intended for character recognition. For example, a slip requiring character recognition and a general document which should be output as an image without character recognition are transmitted together in a single FAX transmission. Accordingly, character recognition is often not appropriate for the image information received.

A general document for which character recognition is not appropriate is one output as an image with reproducibility confirmed visually. For example, there may be no problem in visually verifying a general document, even if an expansion error is generated in the scanning lines corresponding to five (5) percent of the number of scanning lines of a page. However, in the FAX-OCR apparatus of the related art, if an expansion error is generated in the scanning lines corresponding to two or more percent of the scanning lines of a page, the line is disconnected forcibly, even when the image information received is a general document. Accordingly, the receiving process performance for the FAX image information is lowered, which presents a problem in the related art.

Meanwhile, if the line is not disconnected, even when the image information received is a slip or other item which is considered to be the object of character recognition, until the scanning lines generating the expansion error become five (5) percent of the scanning lines of a page, deterioration of the performance for the FAX image information receiving process may be avoided. However, the possibility of receiving the image having poor reproducibility increases. Accordingly, performance of the character recognition process for the FAX image information is lowered, which presents another problem in the related art.

SUMMARY OF THE INVENTION

Considering the background explained above, it is therefore an object of the present invention to provide a FAX-OCR apparatus which is capable of processing the received image depending on the appropriate processing condition for each type of FAX image received.

The present invention solves the above-mentioned problems by providing an apparatus comprising an identifying unit identifying a type of image information input via the communication line, and a modifying unit modifying connecting conditions of the communication line, depending on the identification result by the identifying unit.

In the image processing apparatus of the present invention, a type of image information input via the communication line is identified and the connecting conditions of the communication line are modified depending on the type of image information identified.

When the image information input does not require character recognition, disconnection of the communication line is avoided as much as possible by generally allowing disturbances of the image of about five percent, as discussed herein above. On the other hand, when the input image information requires character recognition, the frequency of erroneous recognition is controlled by severely checking the disturbance of the image.

BRIEF DESCRIPTION OF THE DRAWINGS

These together with other objects and advantages which will be subsequently apparent, reside in the details of construction and operation as more fully hereinafter described and claimed, reference being had to the accompanying drawings forming a part hereof, wherein like numerals refer to like parts throughout.

FIG. 1 is a block diagram illustrating the FAX input controller of the FAX-OCR apparatus of the related art;

DETAILED DESCRIPTION OF THE PREFERRED EMBODIMENTS

Japanese Patent Application No. 8-057336, filed Mar. 14, 1996 in Japan, is incorporated herein by reference.

The embodiments of the present invention are explained in detail with reference to the accompanying drawings.

Figures 2A, 2B:
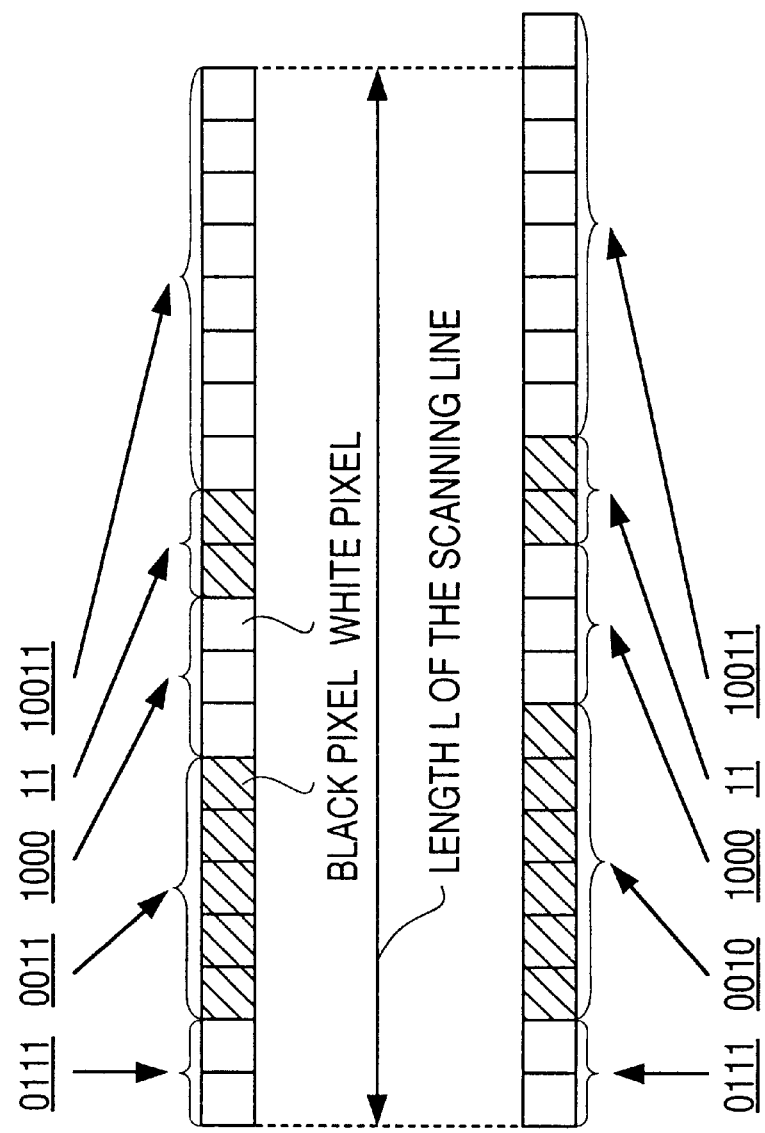
FIGS. 2(A) and 2(B) are diagrams for explaining image disturbance by line error.
Figure 3:
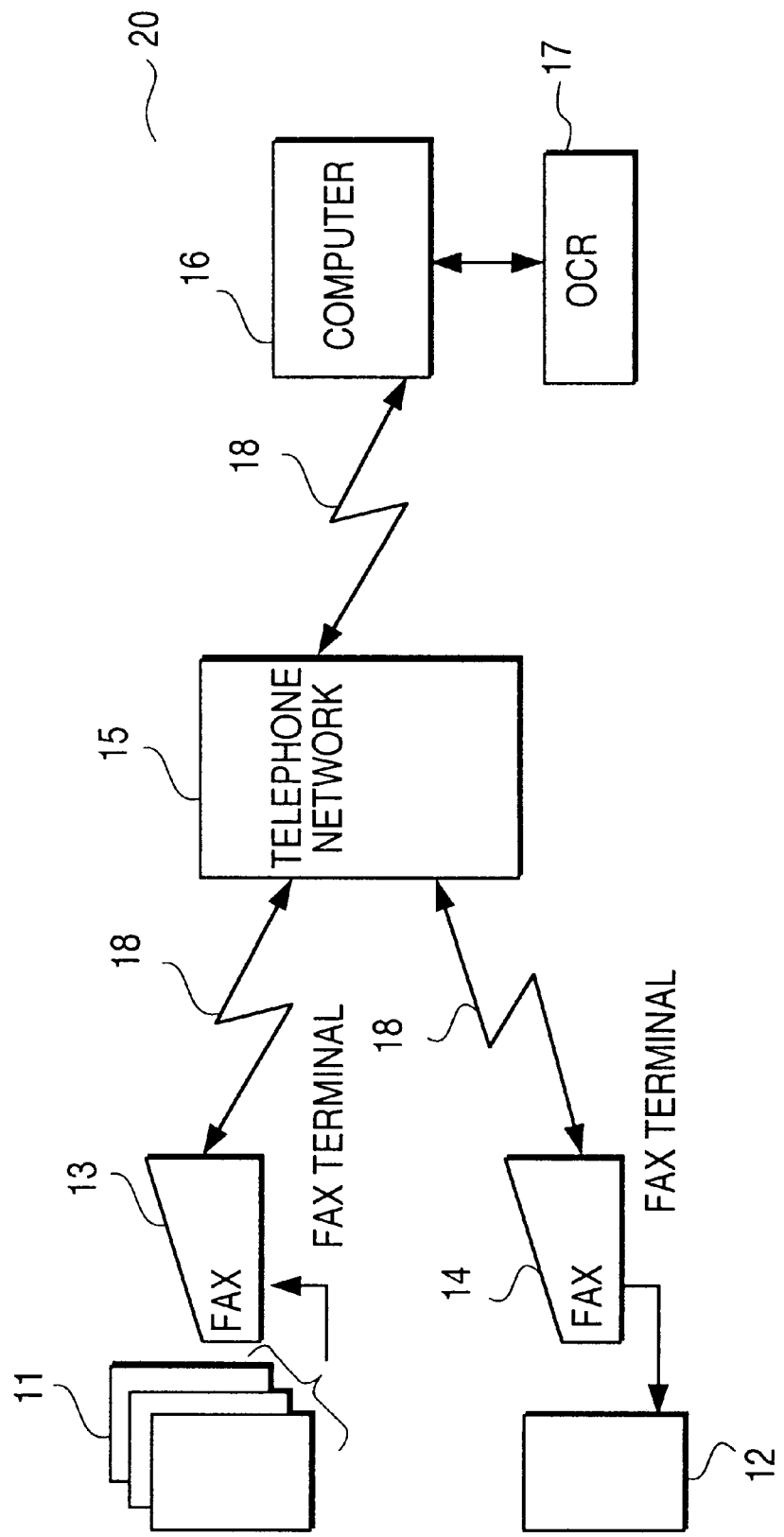
FIG. 3 is a schematic diagram explaining the order receiving and issuing system to which the present invention is applied.

FIG. 3 is a schematic diagram of an order receiving and issuing system to which the present invention is applied. Referring now to FIG. 3, in order receiving and issuing system 20 of the present invention, order issuing slip 11 is input from a FAX terminal 13, which is provided as an information terminal. Image information obtained by the FAX terminal 13 from the order issuing slip 11 is transmitted by FAX over the line 18 to the telephone network 15. Telephone network 15 then transmits the image information to the center computer 16 over the line 18.

The computer 16 shown in FIG. 3 is provided with the functions of the FAX-OCR apparatus of the present invention. An embodiment of the FAX-OCR apparatus of the present invention is explained below, with reference to FIG. 4. Referring now to FIG. 3, when image data of the above-mentioned slip 11 (herein after referred to as slip image data) is received by the computer 16, the computer 16 transmits the slip image data as the image information to Optical Character Recognition Unit (OCR) 17. OCR 7 recognizes characters based on the format parameter information file and thereafter verifies and modifies the recognition result. The format parameter information file is explained below, with reference to FIGS. 4 and 5. Thereafter, OCR 17 outputs to an associated printer (not shown in FIG. 3) as the image output, the data as the detailed statement for issuing an order. OCR 17 also transmits, by FAX through computer 16 and telephone network 15, the image information of the detailed statement for issuing an order to the FAX terminal 14 of the customer as the output of the detailed statement 12 for issuing an order.

Moreover, when image data of a general document is received as the image information by the computer 16 shown in FIG. 3, the image data is either output to the printer without character recognition processing or is transmitted by FAX to the FAX terminal 14 of the customer via the telephone network 15 and line 18.

Figure 4:
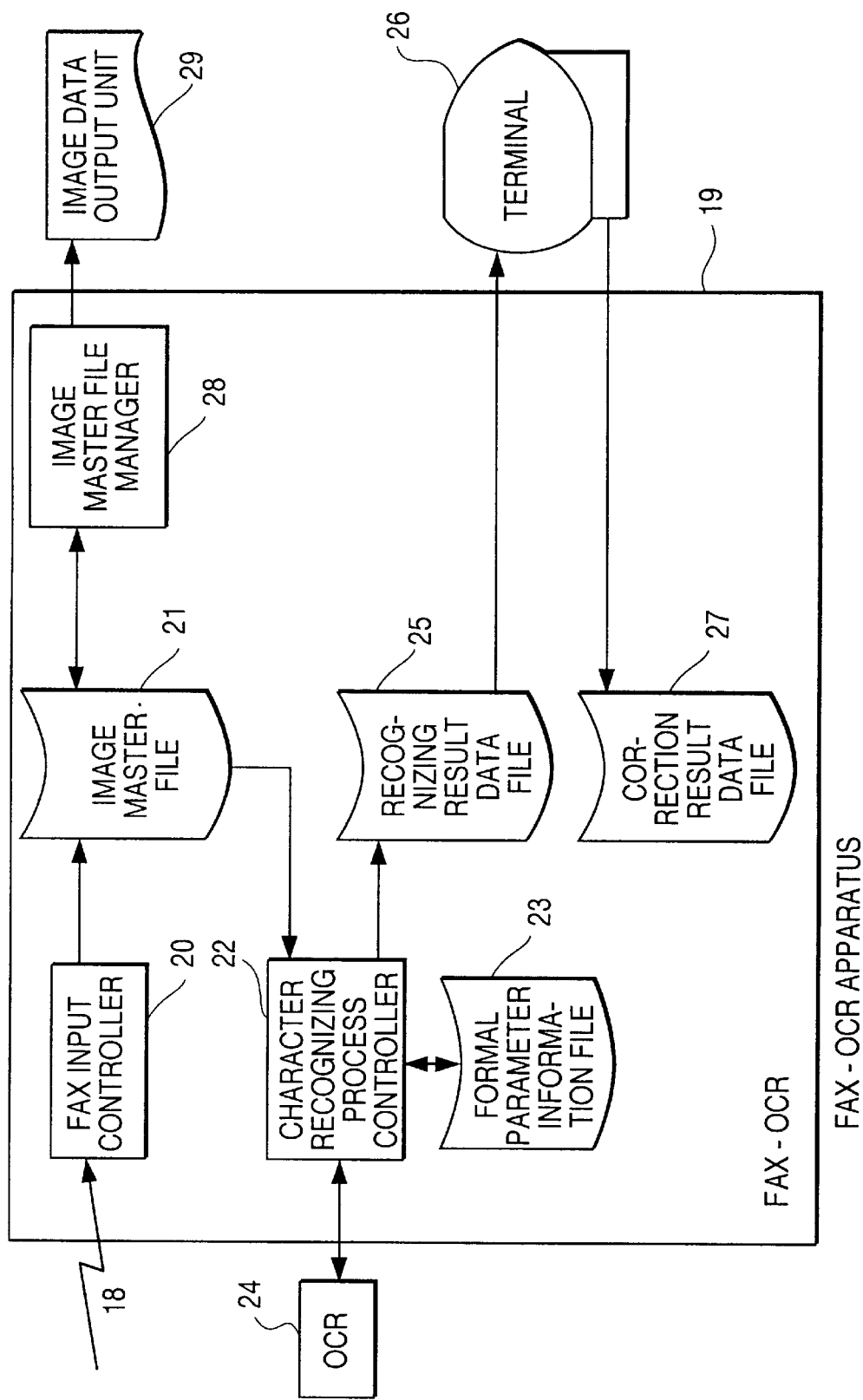
FIG. 4 is a block diagram illustrating a profile of the embodiment of the FAX-OCR apparatus of the present invention.

FIG. 4 is a block diagram illustrating an embodiment of the FAX-OCR apparatus 19 of the present invention. As shown in FIG. 4, a FAX input controller 20 receives the FAX image information transmitted via the communication line 18 and expanding image information input from NCU 1 (not shown in FIG. 4) to execute line connecting processes for the purpose of error checking.

Image master file 21 accumulates image information which has completed error checking by the FAX input controller 20. Character recognizing process controller 22 causes OCR 24 to execute character recognition processing. Character recognizing process controller 22 stores the recognition results obtained by the OCR 24 from the format parameter information file 23 and slip image data stored in the image master file 21 to the recognition result data file 25.

Terminal 26 verifies and modifies the recognition result recognized by the OCR 24 being stored in the recognition result data file. Correction Result Data File 27 accumulates the processing result verified and modified by the terminal 26.

The terminal 26 comprises a CRT for displaying recognition results and other information stored in the recognition result data file 25, and a keyboard for inputting corrected data when correction of the character recognition result is necessary. Neither the CRT nor the keyboard are shown in FIG. 4.

Image master file manager controls output of the image data stored in the image master file 21 to an image data output unit 29. The image output unit comprises a CRT displaying the image data stored in the image master file 21 and/or a printer to provide a hard copy of the image data. Neither the CRT nor the printer are shown in FIG. 4.

Figure 5:
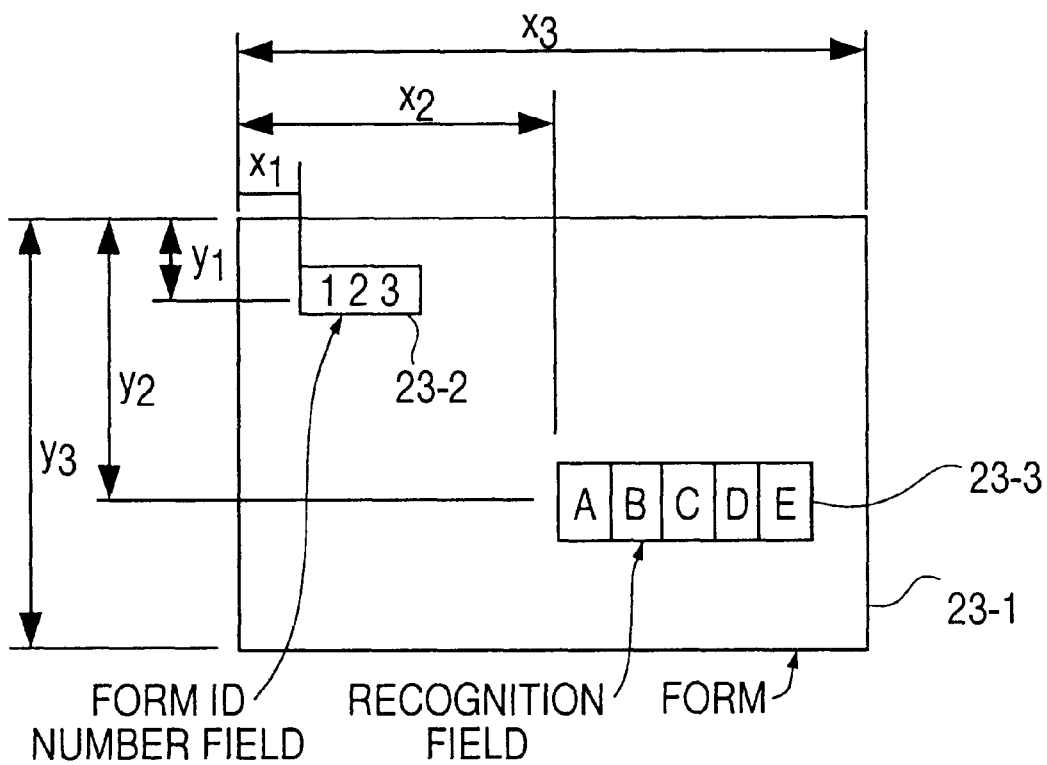
FIG. 5 is a diagram explaining the operation of the format parameter information file of the present invention.

FIG. 5 is a diagram explaining the operation of the format parameter information file 23 of the present invention. The format parameter information file of the present invention is shown in FIG. 4. The format parameter information file 23 stores standard format parameter information that is used when the OCR 24 executes recognition processing. The format parameter information is stored in advance by an operator, before execution of recognition processing. In performing recognition processing, the OCR 24 reads the characters filled in a form 23-1 (or a document) based on the pre-established format parameter information. The format parameter information is produced as an optical character reader scans a format parameter information registering control sheet (herein after referred to as a format control sheet) on which parameter information for preparing the format parameter information has been written, or as an operator inputs the parameter information by the keyboard.

As is shown in FIG. 5, the parameter information comprises form size $(x_3, y_3)$, starting point values $(x_1, y_1)$, of the form ID number field, a type of letters specifying data being numerals or alphabetic and data being typed or handwritten within the form ID number field 23-2, size information specifying the number of digits data consists of in the form ID number field 23-2, starting point values $(x_2, y_2)$ of the recognition field, and size information specifying the number of digits data consists of in the recognition field 23-3.

Figure 6:
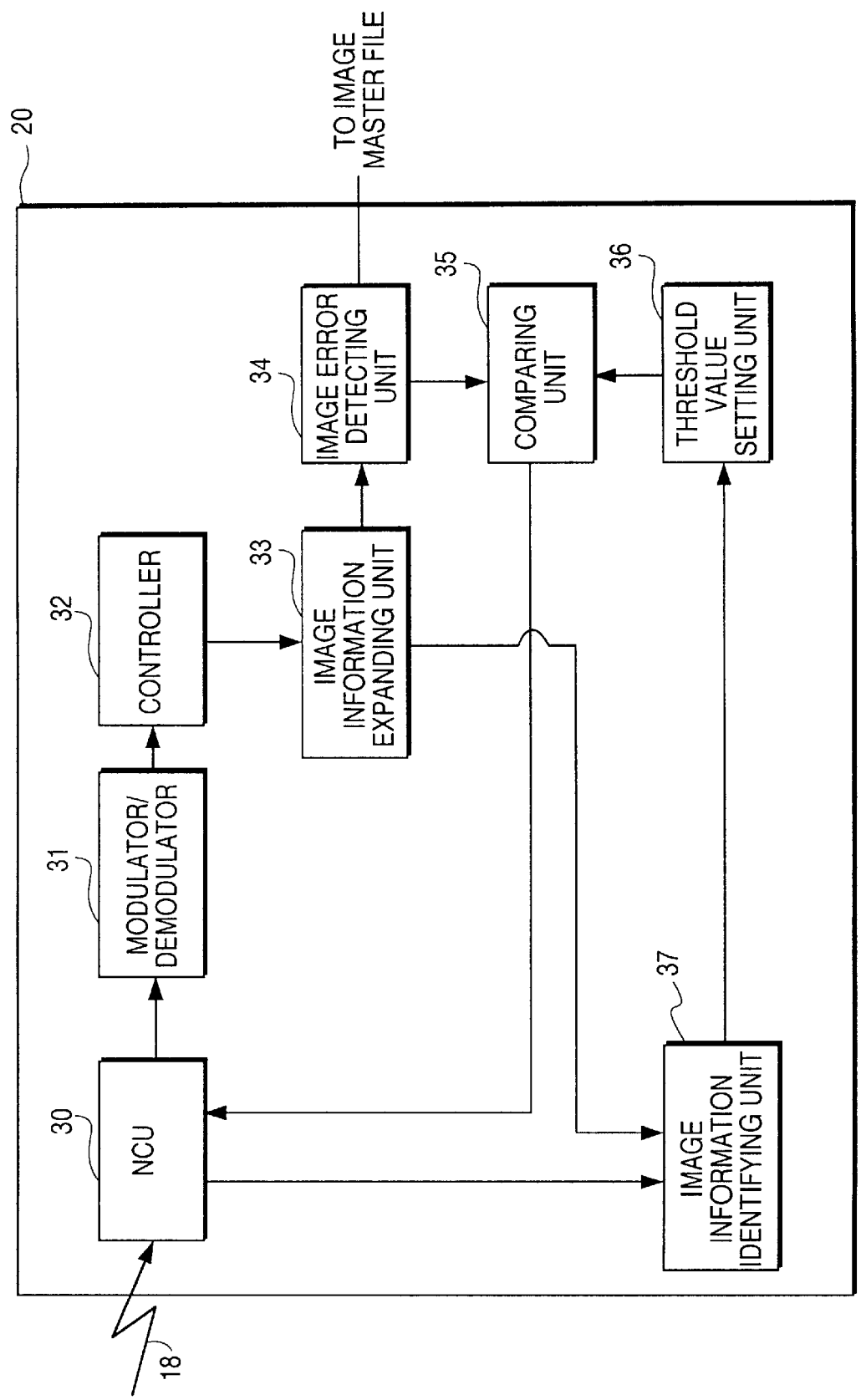
FIG. 6 is a diagram illustrating a profile of the embodiment of the FAX input controller of the present invention.

FIG. 6 is a block diagram of an embodiment of the FAX input controller 20 of the present invention.

Network control unit (NCU) 30 controls the line network 18, as shown in FIG. 6. Modulator/demodulator modulates and demodulates image information received via NCU 30. Controller 32 controls an instruction for initiating the expanding process described herein above by transmitting the image data, during detection of the EOL, extracted from the image information digitized in the modulator/demodulator means 31 to the image data expanding unit 33 in units of the scanning line. Controller 32 also controls the modulator/demodulator by using the communication sequence data other than the image data as the control signal.

Image information expanding unit 33 executes the expanding process of image data in units of the scanning line, by receiving an instruction from the controller 32. Image error detecting unit 34 counts the number of expansion errors by detecting the expansion errors of the expanded image data.

Comparing unit 35 instructs disconnection of line 18 to the NCU 30 by comparing a count value of the image error detecting unit 34 with a reference value preset in threshold value setting unit 36 and determines that the received image information is erroneous when the number of errors detected exceeds the reference value.

The threshold value setting unit 36 sets the reference value of the number of expansion errors for the comparing unit 35 to determine whether the line 18 should be disconnected. This threshold value setting unit 36 sets, as the reference value, the number of scanning lines, for example, corresponding to two percent of the scanning lines of a page when the image information received includes the character recognition information, or the number of scanning lines, for example, corresponding to five percent of the scanning lines of a page when the image information received does not include the character recognition information.

Image information identifying unit 37 identifies whether the image information received by NCU 30 includes the character recognition information or not. Image information identifying unit 37 sets, as the threshold value, the reference value depending on a type of image information received by the threshold value setting unit 36. Image information identifying unit 37 is explained in detail below.

In the above-mentioned embodiment of the present invention, when the image information received includes the character recognition information, the number of scanning lines corresponding to two percent of the scanning lines of a page is set as the reference value to the threshold value setting unit 36. When the image information received does not include the character recognition information, the number of scanning lines corresponding to five percent of the scanning lines of a page is set as the reference value to the threshold value setting unit 36. However, the number of scanning lines is not limited only to these values and such value can be selected freely depending on the character recognition performance of the OCR 24.

Figure 7:
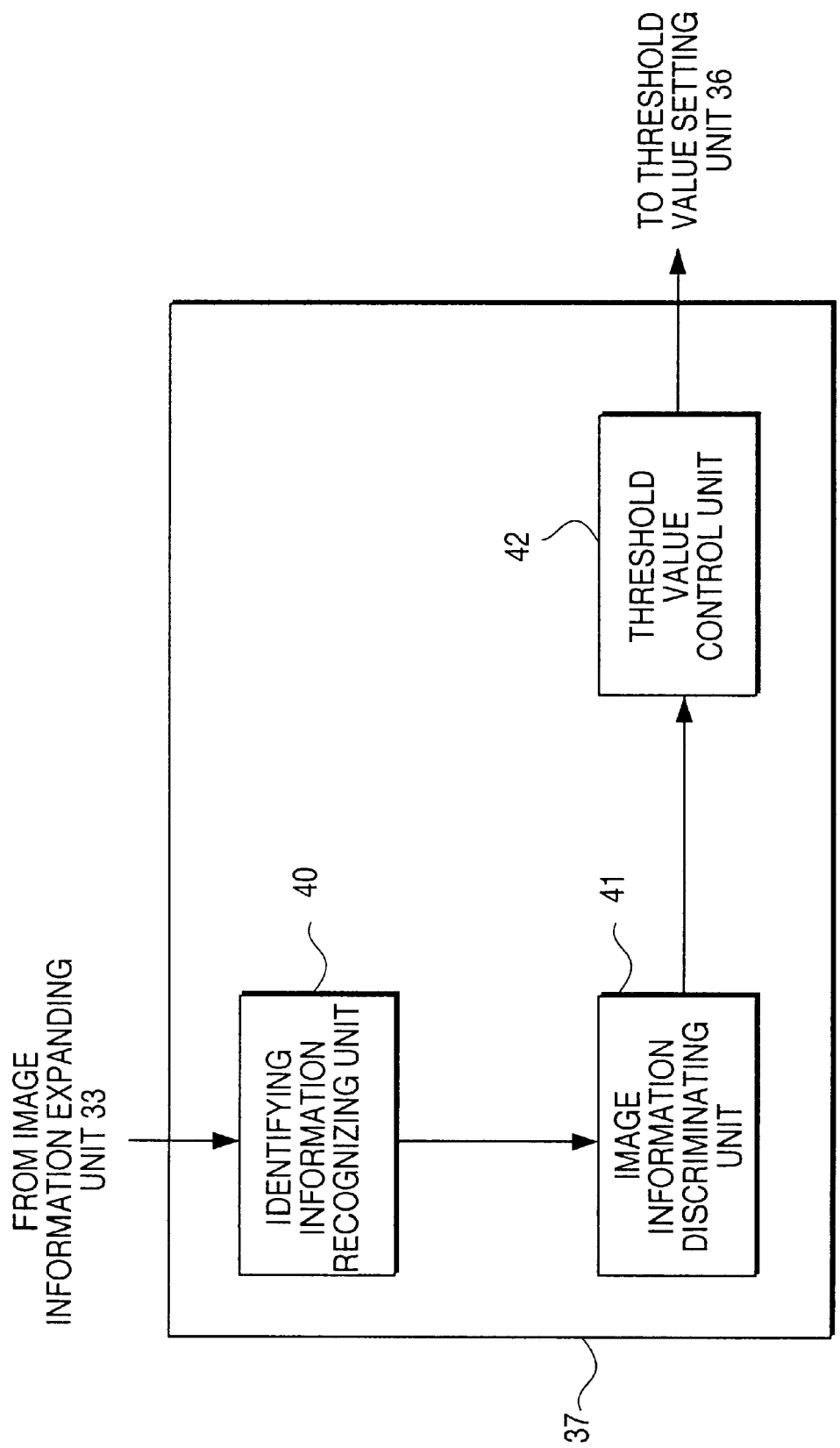
FIG. 7 is a block diagram illustrating a profile of the first embodiment of the image information identifying means of the present invention.

FIG. 7 is a block diagram illustrating a first embodiment of the image identifying unit 37 of the present invention.

Identifying information recognizing unit 40 detects and recognizes an identification mark from the image information being expanded in the image expanding unit 33.

The above-mentioned identification mark is the identification information identifying the type of image information, whether the image information received is the image information of a document including character recognition information or not. A type of image information is pre-set depending on the existence of the identification mark or the shape of the mark. In general, the particular mark is attached to a predetermined position on the document, for example, at the left corner of the document when the document includes the character recognition information.

Image information discriminating unit 41 discriminates whether the image information expanded on the basis of the recognition result from the identifying information recognizing unit 40 is image information of a document (hereinafter referred to as document image information) including the character recognition information or not. When the identification mark is not detected by the identifying information recognizing unit 40, the expanded image information is determined to be a general document not including the character recognition information. Meanwhile, when the identification mark is detected by the identifying information recognizing unit 40, the identification mark detected is recognized for collation of the recognition result.

Here, when the recognition result matches the result previously registered, the expanded image information is determined to be the slip 11 including character recognition information. When the recognition result does not match the preregistered result, the expanded image information is determined to be general document information not considered the object of the character recognition process.

Threshold value control unit 42 instructs modification of the threshold value to the threshold value setting unit 36 (shown in FIG. 6), depending on the result of the determination in the image information discriminating unit 41. When the expanded image information is an object of the character recognition process, the threshold value allowing the number of expanding errors resulting in less erroneous recognition is set. When the expanded image information is not an object of the character recognition process, an instruction is issued to the threshold value setting unit 36 to set the threshold value allowing the number of expanding errors resulting in less line disconnection.

The techniques for providing an ID column to the predetermined position on the slip 11 to be recognized and then identifying the FAX receiving image as the general document information and the slip to be character recognized depending on the recognition result of the ID column has been described in printed matter (Official Gazette of Japanese Patent Laid-Open No. 62764/1983), published before the application date of the present invention.

In the FAX-OCR apparatus 19 of the present invention having the image information identifying unit 37 constructed as explained above, whether the received image includes the character recognition information or not is determined depending on existence of the identifying information provided in the image information.

When the received information is determined to include the character recognition information, the received image information resulting in less erroneous recognition can be rendered to the recognizing process by setting a threshold value allowing the number of errors for character recognition explained above, while the image process resulting in less line disconnection may be executed for the received image not including character recognition information.

Figure 8:
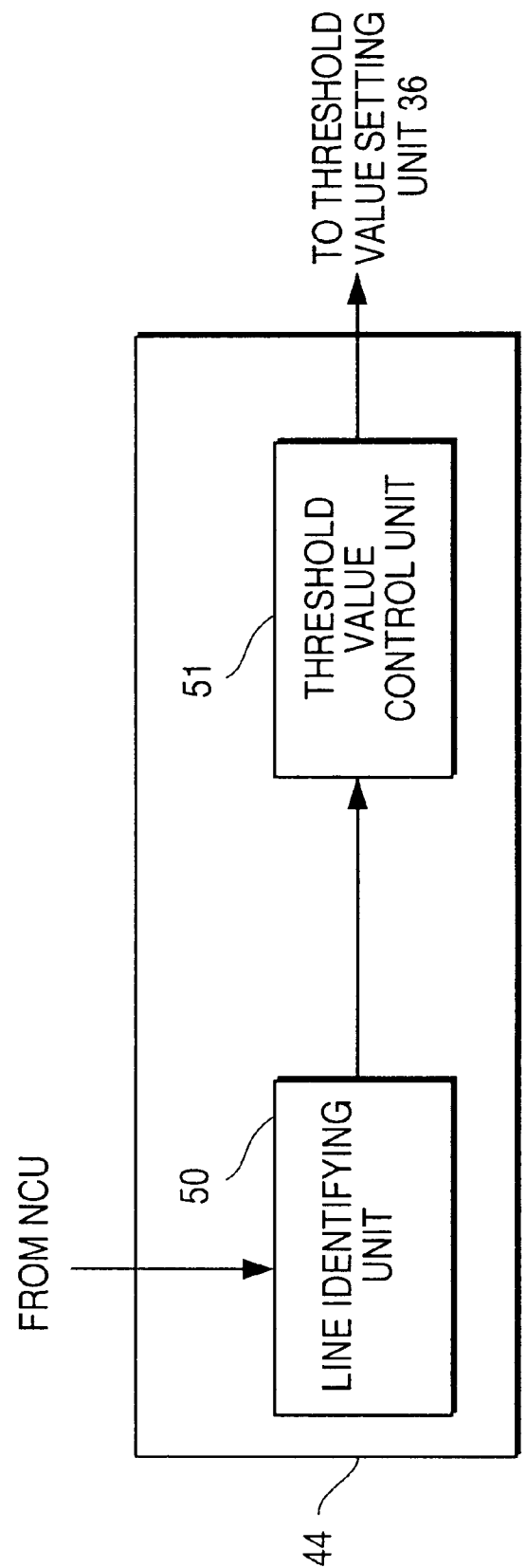
FIG. 8 is a block diagram illustrating a profile of the second embodiment of the image information identifying unit of the present invention.

FIG. 8 is a block diagram illustrating a second embodiment of the image information identifying unit 44 of the present invention.

An NCU (not shown in FIG. 8) is connected to communication lines. The communication lines are divided into at least two groups of leased lines: (1) one group of leased lines receives the slip image data as the object of character recognition, and (2) a second group of leased lines receives the image data of a general document not designated as the object of character recognition.

Line identifying unit 50 identifies a type of line providing received image information. The line identifying unit 50 discriminates a type of receiving line by receiving, from the NCU, the identifying information indicating the leased line used for receiving the image information.

Threshold value controlling unit 51 instructs modification of the threshold value of the threshold value setting unit 36 depending on the identification result from the line identifying unit 50. This threshold value controlling unit 51 issues an instruction to the threshold value setting unit 36 to set the threshold value allowing the number of expanding errors resulting in less erroneous recognition when the image information is received by the leased line for receiving the slip image data, and to set the threshold value allowing the number of expanding errors resulting in less line disconnection when the image information is received by the leased line for receiving the general document image data.

In the FAX-OCR apparatus comprising the image information identifying unit 44 constituted as described above, whether the received image includes the character recognition information or not is determined based on a type of communication used for receiving the image information.

When the received image is determined to include the character recognition information, the received image information resulting in less erroneous recognition can be achieved by setting the threshold value allowing the number of errors for character recognition. Further, image processing resulting in less line disconnection may be executed for the received image not including the character recognition information.

Figure 9:
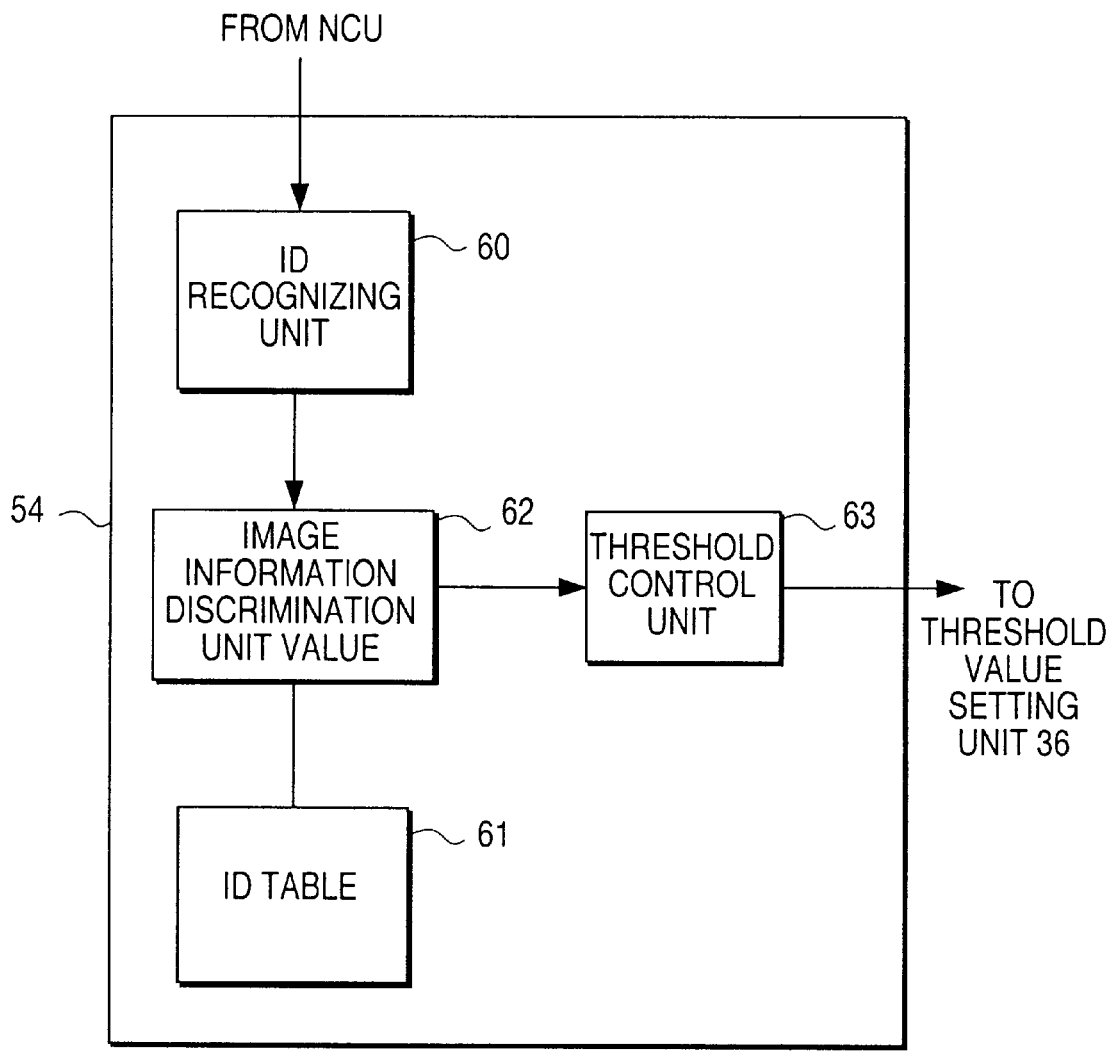
FIG. 9 is a block diagram illustrating a profile of the third embodiment of the image information identifying unit of the present invention.

FIG. 9 is a block diagram illustrating a third embodiment of the image information identifying unit 54 of the present invention.

ID identifying unit 60 recognizes the identifying information (hereinafter referred to as the ID) from the FAX image information received by the NCU (which is not shown in FIG. 9). Since an identifying section for setting the subscriber identification conforming to CCITT recommendations is provided in the phase of the time series of the facsimile call of the received FAX image information, the ID identifying unit 60 recognizes the subscriber identification set in this identifying section as the ID of the transmitting FAX.

ID table 61 stores the ID of the FAX for transmitting image information of a document including the character recognition information, which ID had been previously registered therein. Image information discriminating unit 62 discriminates whether the image information of the document includes the character recognition information or not by detecting whether the ID recognized in the ID recognizing unit 60 is already registered in the ID table 61.

Threshold value control unit 63 instructs modification of the threshold value of the threshold value setting unit 36, which modification depends on the result of the discrimination in the image information discriminating unit 61. Threshold value control unit 63 instructs the above-mentioned modification by issuing an instruction to the threshold value setting unit 36 to set, when the received image information is an object of character recognition processing, the a threshold value allowing the number of expanding errors resulting in less erroneous recognition or to set, when the received image information is not an object of the character recognition processing, the threshold value allowing the number of expanding errors resulting in less line disconnection.

In the FAX-OCR apparatus comprising the image information identifying unit 54 constituted as explained above, only the received image from the FAX registered previously can be discriminated as including the character recognition information. In which case, the received image information resulting in less erroneous recognition can be recognized by setting the threshold value allowing the number of errors for character recognition if the character recognition information is included, and the image processing resulting in less line disconnection can be performed for the received image not including the character recognition information.

Figure 10:
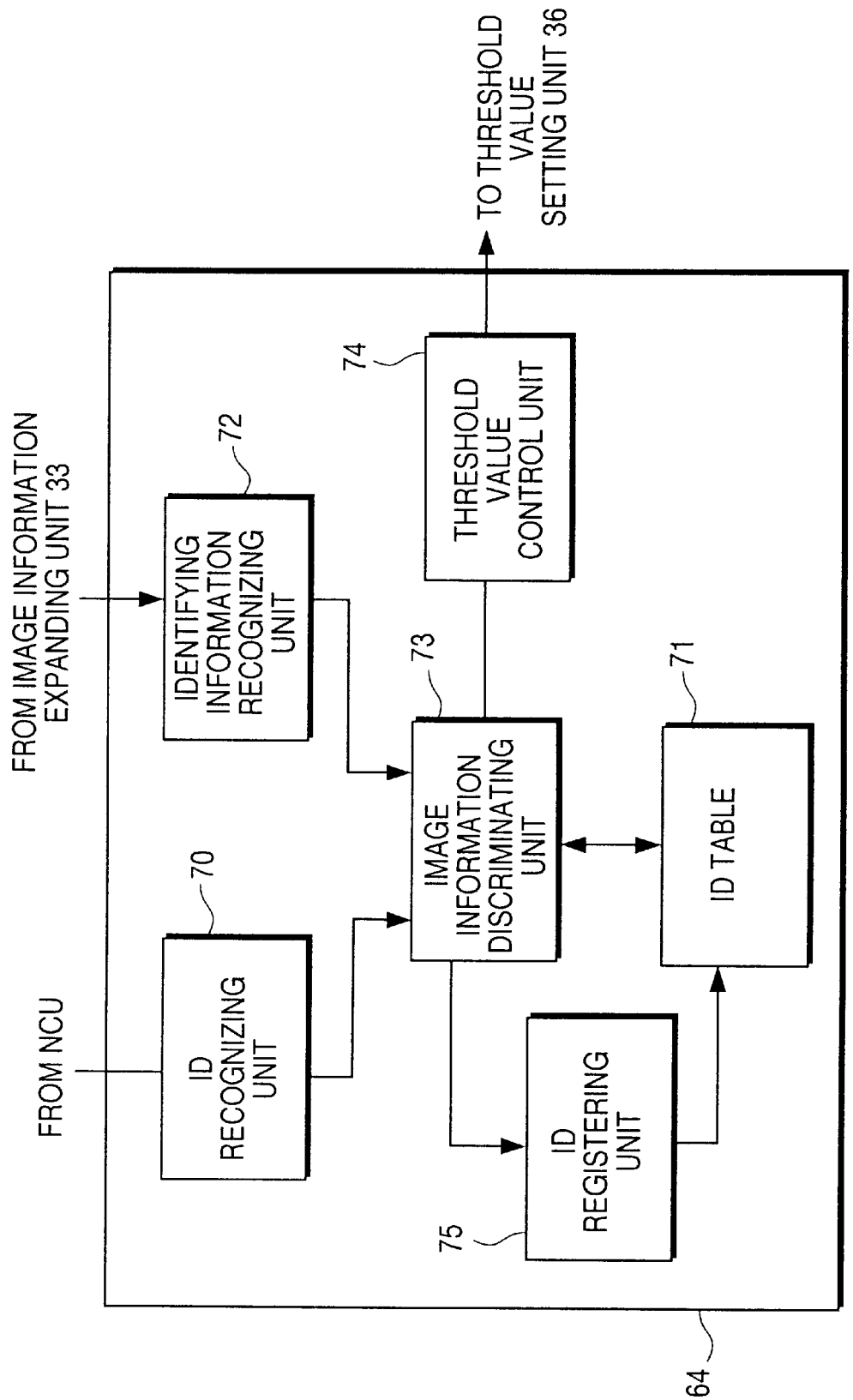
FIG. 10 is a block diagram illustrating a profile of the fourth embodiment of the image information identifying unit of the present invention.

FIG. 10 is a block diagram illustrating a fourth embodiment of the image information identifying unit 64 of the present invention.

ID identifying unit 70 identifies the identification information (hereinafter referred to as the ID) of a transmitted FAX from the FAX image information received by the NCU (not shown in FIG. 10). Since an identifying section for setting the subscriber identification conforming to CCITT recommendations is provided in the phase of the time series of the facsimile call of the received FAX image information, the ID identifying unit 70 recognizes the subscriber identification set in this identifying section as the ID of the transmitting FAX.

ID table 71 registers the ID of the FAX for transmitting the image information of a document including the character recognition information. Identifying information recognizing unit 72 detects an identification mark from the image information expanded in the image information expanding unit 33 to execute a recognizing process of the detected identification mark.

This identification mark is the identification information identifying a type of image information whether the image information received is the image information of a document including the character recognition information or not. A type of image information is pre-set depending on the existence of the identification mark or the shape of the mark. In general, the particular mark is attached to the document at a predetermined position, for example, at the left corner of the document when the document includes the character recognition information.

Image information discriminating unit 73 discriminates whether the image information is document information including the character recognition information, by detecting whether the ID recognized by the ID recognizing unit 70 is already registered in the ID table 71. Image information discriminating unit 73 also discriminates whether the image information expanded on the basis of the recognition result from the identifying information recognizing unit 72 is the document image information including the character recognition information.

Image information discriminating unit 73 discriminates, when the identification mark is not detected in the identifying information recognizing unit 72, the expanded image information as a general document not including the character recognition information. Image information discriminating unit 73 also collates the result of recognition by recognizing the detected identification mark when the identification mark is detected in the identifying information recognizing unit 72.

When the recognized result matches the registered ID, the expanded image information is discriminated as a slip 11 including the character recognition information. When the result does not match the registered ID, the expanded image information is discriminated as a general document not considered as the object of character recognition process.

Threshold value control unit 74 instructs modification of the threshold value to the threshold value setting unit 36 depending on the discrimination result in the image information discriminating unit 73. The threshold value control unit 74 instructs the threshold value setting unit to set the threshold value allowing the number of expansion errors resulting in less erroneous recognition when the received image information is an object of the character recognition process, or to set the threshold value allowing the number of expansion errors resulting in less line disconnection when the received image information is not the object of the character recognition process.

ID registering unit 75 registers, to the ID table 71, the ID of the FAX having transmitted the image information of the document including the character recognition information, depending on the discrimination result in the image information discriminating unit 73, as explained below.

The ID registering unit 75 registers the ID of the FAX which transmitted the image information when the ID recognized in the ID recognizing unit 70 is discriminated in the image information discriminating unit 73 as not registered in the ID table 71 as a result of detection whether it is registered in the ID table or not, and the recognition result from the identifying information recognizing unit 72 is matched with the pre-registered identification mark. Accordingly, the expanded image information is discriminated as the slip 11 including the character recognition information.

Next, image information receiving operations of the image information identifying unit 64 of the fourth embodiment constituted as described above are explained.

Figure 11:
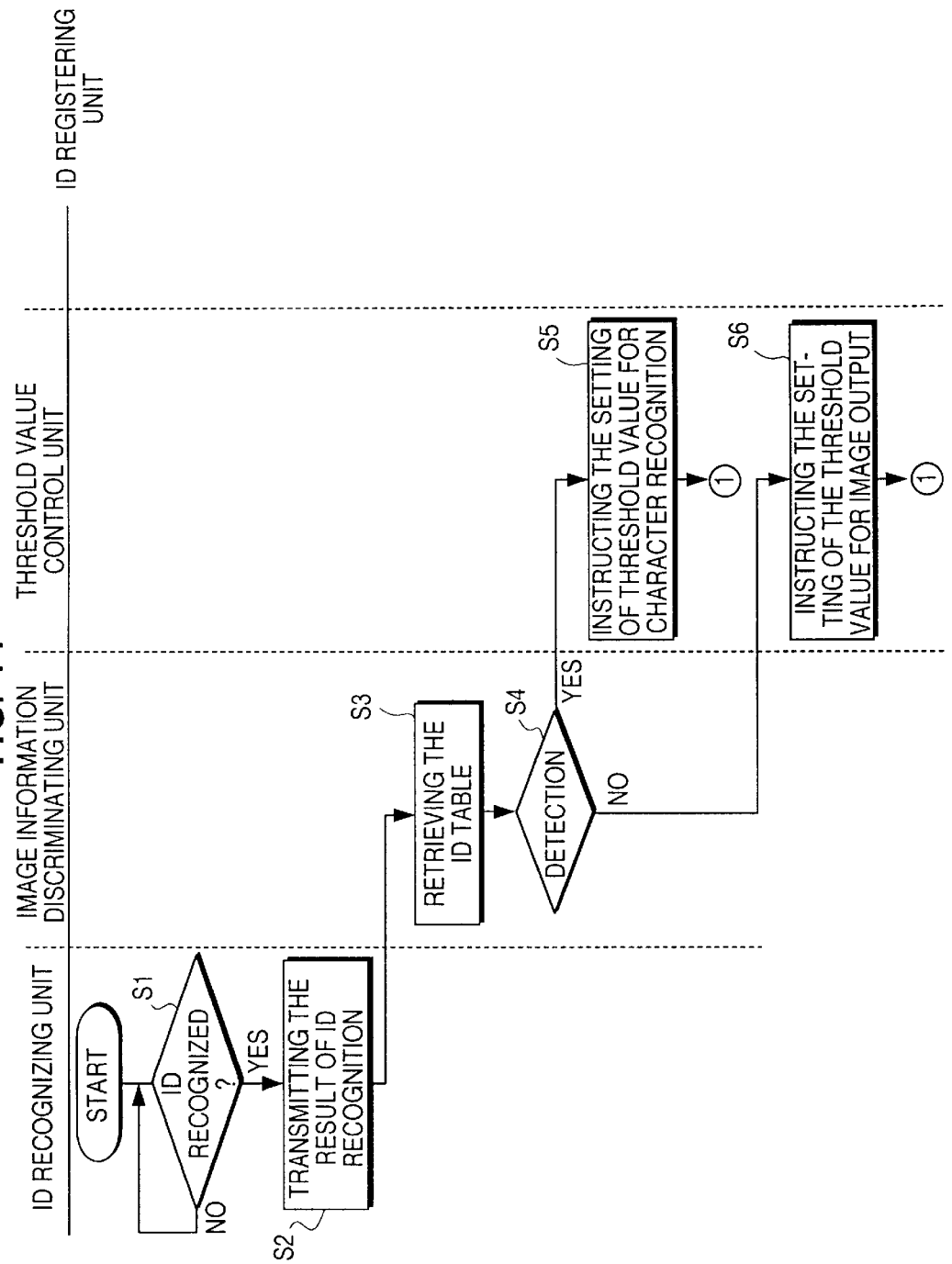
FIG. 11 is an operation flowchart of the image information identifying unit of the fourth embodiment of the present invention.
Figure 12:
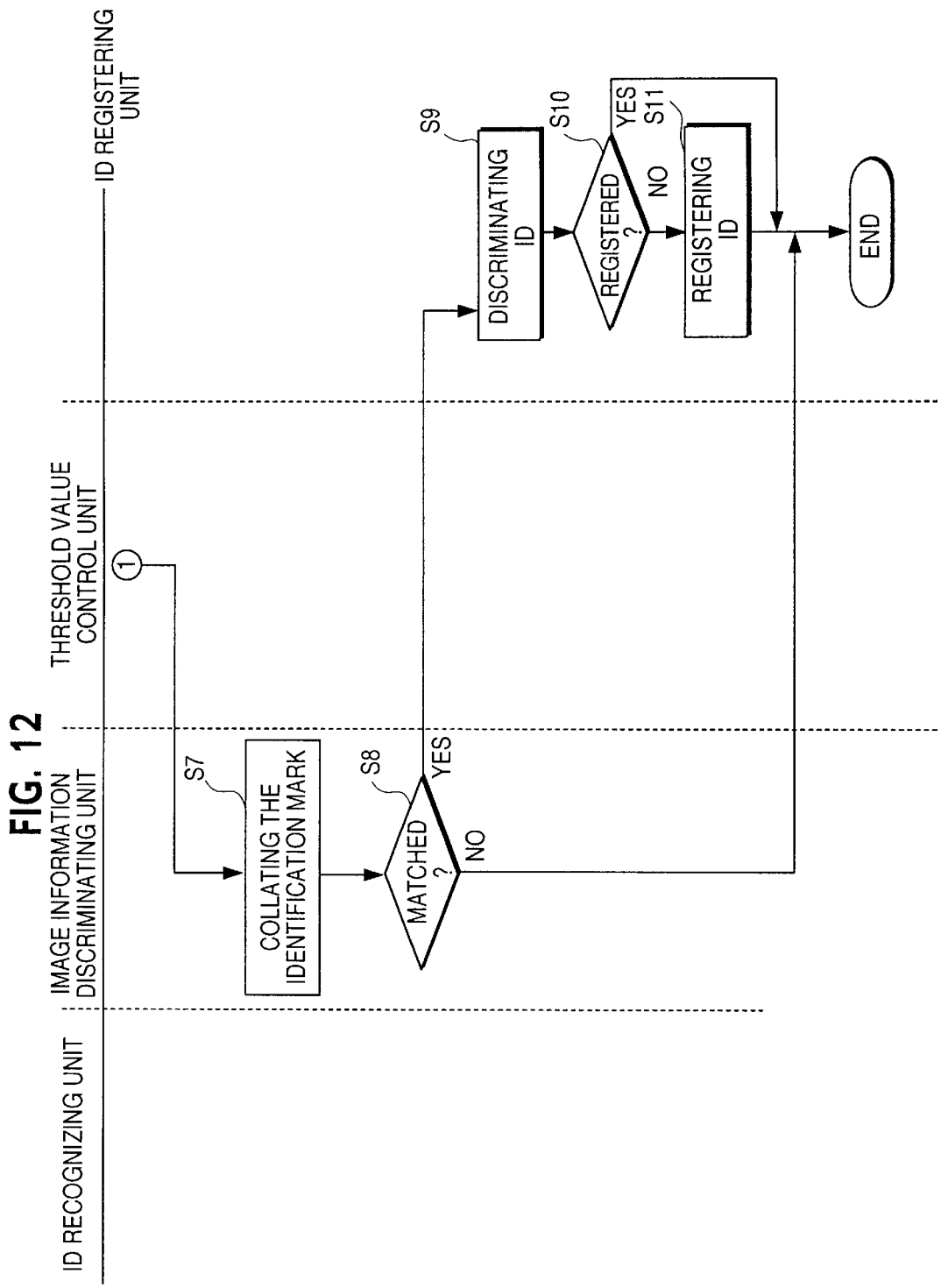
FIG. 12 is an operation flowchart (continued) of the image information identifying unit of the fourth embodiment of the present invention.

FIG. 11 and FIG. 12 are operation flowcharts of the image information identifying unit 64 of the fourth embodiment of the present invention.

Referring now to FIG. 11, in step S1, when the NCU receives the FAX signal from the transmission line, the ID recognizing unit 70 discriminates whether the ID of transmitted FAX is recognized or not. When the ID is recognized, the recognition result is transmitted to the image information discriminating unit 73 in step S2.

When the recognition result is transmitted to the image information discriminating unit 73, the ID table 71 is retrieved, in step S3, whether the ID of recognition result transmitted from the image information discriminating unit 73 is already registered in the ID table or not.

When the matched ID is found in the ID table 71 in step S4, the threshold value setting unit 74 instructs, in step S5, the threshold value setting unit 36 to set the threshold value for the character recognition allowing the number of expansion errors resulting in less erroneous recognition.

When the matched ID is not found in step S4, the threshold value control unit 74 instructs, in step S6, the threshold value setting unit 36 to set the threshold value for image output allowing the number of expansion errors resulting in less line disconnection.

Next, in step S7 of FIG. 12, the image information discriminating unit 73 retrieves the identification mark from the image information expanded in the image information expanding unit 33 and collates the recognition result from the identifying information recognizing unit 72 for recognizing the detected identification mark with the pre-registered identification mark.

When the recognition result from the identifying information recognizing unit 72 is matched with the registered one in step S8, the ID registering unit 75 discriminates, in step S9, whether the ID recognized in the ID recognizing unit 70 is not yet registered in the ID table 71.

When the ID is not yet registered in the ID table in step S10, the ID recognized in the ID recognizing unit 70 is registered in the ID table 71 in step S11, completing the process. On the other hand, when the ID recognized in the ID recognizing unit 70 is found, in step S10, to be already registered, the ID registering process is not carried out, and the process is complete.

When the recognition result from the identifying information recognizing unit 72 is not matched with the previously registered one in step S8, the expanded image information is found to be a general document which is not an object of the character recognizing process. The processing is therefore completed because the ID of the FAX having transmitted the image information is not the object of the above-mentioned registration process.

In the FAX-OCR apparatus comprising the image information recognizing unit 64 which is constituted and operates as explained above, since the ID of the FAX having transmitted the received information including the character recognition information is registered to the table, the signal received later and again from the same FAX can be received with the threshold value allowing the number of errors for character recognition, enabling the recognition process of the received image information with less erroneous recognition and also enabling image processing with less line disconnection for the received image not including the character recognition information.

Figure 13:
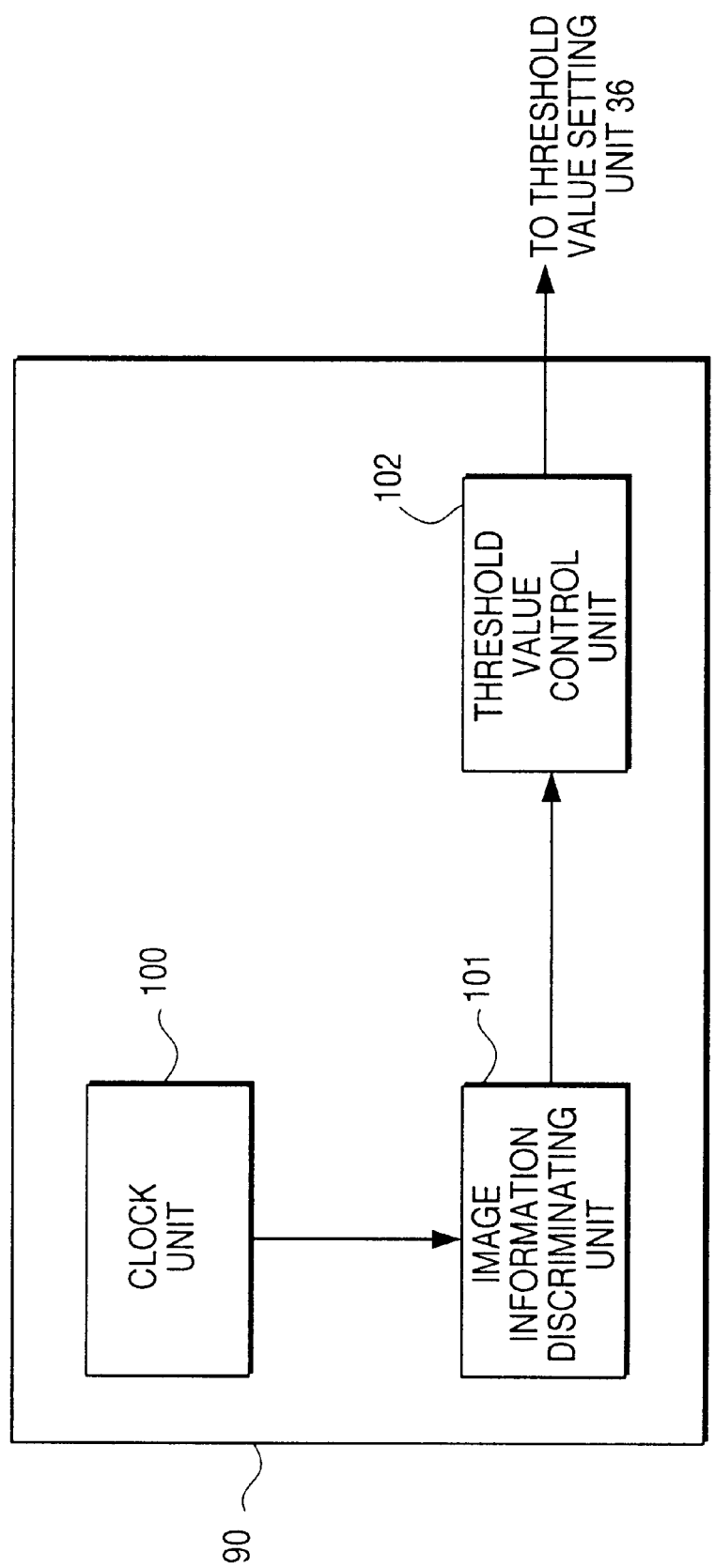
FIG. 13 is a block diagram illustrating a profile of the fifth embodiment of the image information identifying unit of the present invention.

FIG. 13 is a block diagram illustrating a fifth embodiment of the image information identifying unit 90 of the present invention.

Clock unit 100 measures time. Image information discriminating unit 101 discriminates whether the image information received on the basis of the time from the clock unit 100 is the image information of the document including the character recognition information.

The image information discriminating unit 101 separates the time schedule for receiving the image information into the time schedule for receiving a slip image data as the object of the character recognition and the time schedule for receiving the general document image data not the object of the character recognition. Accordingly, the image information discriminating unit 101 discriminates a type of the received image information depending on the time information from the clock unit.

Threshold value control unit 102 instructs the threshold value setting unit 36 to modify the threshold value depending on the discrimination result of the image information discriminating unit 101. This threshold value control unit 102 instructs the threshold value setting unit 36 to set, in the time schedule for receiving the image information as the slip image data, the threshold value allowing the number of expansion errors resulting in less erroneous recognition and to set, in the time schedule for receiving the image information as the general document image data, the threshold value allowing the number of expansion errors resulting in less line disconnection.

In the FAX-OCR apparatus comprising the image information identifying unit 90 constituted as described above, whether the received image includes the character recognition information or not is discriminated depending on the time schedule of having received the image information.

When the received image is discriminated as including the character recognition information, the received image information resulting in less erroneous recognition can be recognized by setting the threshold value allowing the number of errors for character recognition and the image processing resulting in less line disconnection can be enabled for the received image not including the character recognition information.

Next, the image information receiving operations of the FAX-OCR apparatus of the present invention constituted as explained above is explained.

Figure 14:
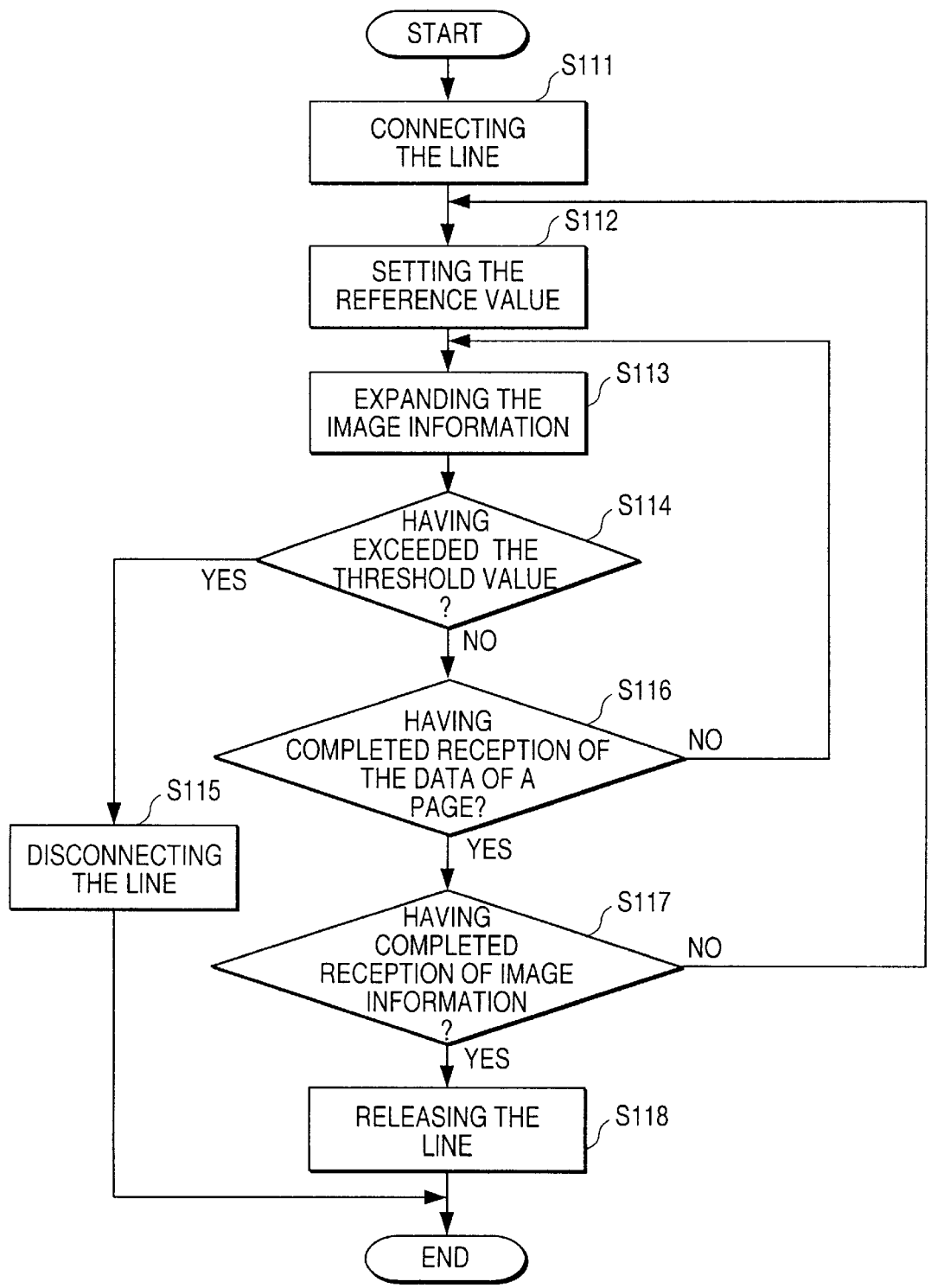
FIG. 14 is an image information receiving flowchart of the FAX-OCR apparatus of the present invention.

FIG. 14 is an image information receiving operation flowchart of the FAX-OCR apparatus of the present invention.

As shown in FIG. 14, NCU 30 starts the FAX signal receiving control after connection of the transmission line in step S11. Next, the reference value for determining whether the communication line used for reception of a FAX image should be disconnected or not is set, in step S112, on the basis of the type of image information transmitted from the transmitting FAX by the image information identifying unit 37.

Next, in step S113, the image information received by the image information expanding unit 33 is expanded in every line, correct expansion is detected for every line by the image error detecting unit 34, and an error is counted if a line is not correctly expanded. In step S114, whether the number of errors of the image information expanded by the comparing unit 35 has exceeded the reference value or not is discriminated.

When the number of errors of expanded image information has exceeded the reference value, the line is forcibly disconnected to complete the processing in step S115 by issuing an instruction to disconnect the communication line from the comparing unit 35 to NCU 30.

Moreover, when the number of errors of expanded image information does not exceed the reference value, the control unit 32 discriminates, in step S116, whether the image information of a page has been expanded or not. When the image information has not yet been expanded completely, the above process is repeated in step S113.

However, when the image information of a page has been completely expanded, the above processing are repeated in step S112 until the end of the reception of the image information is discriminated in step S117. When reception of the image information is completed, the transmission line is released in step S118, to complete the processing.

According to the present invention, since the reference value for disconnecting the transmission line or not depending on the transmitting information for the image information of a page is set, the severe requirements for both receiving processing schedule and recognizing performance of the FAX image information can be satisfied flexibly as required.

Moreover, since the comparing unit in the embodiments of the present invention can also be implemented with software of the control unit, similar effects can also be assured.

As explained above, according to the present invention, since the receiving process is executed on the basis of different threshold values depending on contents of the input image data, when image data other than the slip is received, unwanted disconnection of the line carrying the input image data can be avoided by processing image disturbances based on the ordinary threshold value. Further, when the slip data requiring the recognition process is received, the slip information can be recognized with higher accuracy by severely checking for image disturbances.

Therefore, erroneous reading of characters and rejections can be reduced, and the burden on the operator during the operation can also be reduced, to realize effective slip processing.

The present invention is not limited to the embodiments, described above, but also encompasses variations thereof.

A wide range of different working modes can be formed based on the present invention without deviating from the spirit and scope of the present invention. The present invention, therefore, is not restricted by its specific working modes except being limited by the appended charges.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An image processing apparatus receiving image information through a communication line coupled to said apparatus, said apparatus comprising:
   an identifying unit identifying a type of the image information received through the communication line coupled to said apparatus; and
   a modifying unit modifying a connecting condition for said communication line depending on the identification result of said identifying unit, wherein the communication line is connected or is disconnected from the apparatus based upon the connecting condition corresponding to the type of received image information.

2. An image processing apparatus as set forth in claim 1, wherein said identifying unit identifies a type of image information based on identification information preset in the input image information.

3. An image processing apparatus as set forth in claim 1, wherein said identifying unit identifies a type of image information based on the communication line through which said image information is input.

4. An image processing apparatus comprising:
   an identifying unit identifying a type of image information input through a communication line coupled to said apparatus; and
   a modifying unit modifying a connecting condition for said communication line depending on the identification result of said identifying unit, wherein said connecting condition for said communication line is an allowable threshold value of a number of line errors included in the image information for determining whether said communication line should be disconnected,
   wherein the communication line remains connected or is disconnected based upon the connecting condition.

5. An image processing apparatus comprising:
   an identifying unit identifying a type of image information input through a communication line coupled to said apparatus, wherein said type of image information is determined based on whether the image information includes video information as an object of character recognition processing; and
   a modifying unit modifying a connecting condition for said communication line depending on the identification result of said identifying unit.

6. An image processing apparatus comprising:
   an identifying unit identifying a type of image information input through a communication line coupled to said apparatus, wherein said identifying unit identifies a type of image information based on whether identification information identifying an originating area from which said image information is transmitted to said communication line previously registered; and
   a modifying unit modifying a connecting condition for said communication line depending on the identification result of said identifying unit.

7. An image processing apparatus as set forth in claim 6, further comprising a registering unit registering the identifying information identifying the originating area having transmitted said image information to said communication line based on the identification information preset in the input image information.

8. A method of processing images by a computer receiving image information through a communication line, said method comprising:
   identifying by the computer a type of the image information received through the communication line; and
   modifying by the computer a connecting condition for said communication line depending on the identification result,
   wherein the communication line is connected or is disconnected based upon the connecting condition corresponding to the type of received image information.

9. A method of processing an image comprising characters by a computer, said method comprising the steps of:
   receiving the image by the computer from a transmission line connected to the computer;
   establishing by the computer a first threshold value if the characters of the image are to be recognized by the computer and a second threshold value if the characters are not to be recognized by the computer;
   counting by the computer a number of errors in the image; and
   disconnecting the transmission line by the computer if the number of errors exceeds one of the first threshold value if the characters of the image are to be recognized by the computer, and the second threshold value if the characters are not to be recognized by the computer.

10. A FAX input controller comprising:
   a network control unit receiving a signal comprising image information from a communication line coupled thereto and outputting the signal;

a modulator/demodulator, coupled to the network control unit, receiving the signal and extracting from the signal digital image information;

a controller, coupled to the modulator/demodulator, outputting control signals based on the digital image information;

an image information identifying unit, coupled to the network control unit, determining a type of image encoded in the image information;

an image information expanding unit, coupled to the controller, receiving the control signals and expanding the digital image information based thereon into a digital image;

an image error detecting unit, coupled to the image information expanding unit, counting a number of errors in the digital image, and outputting the number;

a threshold value setting unit, coupled to the image information identifying unit, setting a first threshold value and a second threshold value based on the type of image; and a comparing unit, coupled to the image error detecting unit and to the network control unit, comparing the number of errors to one of the first threshold value and the second threshold value based on the type of image, and outputting a signal to the network control unit to disconnect the communication line if the number of errors exceeds the one of the first threshold value and the second threshold value being compared.

11. A FAX input controller as claimed in claim 10, wherein the image information identifying unit comprises:

an identification information recognizing unit recognizing information in the image information identifying the type;

an image information discriminating unit, coupled to the identification information recognizing unit, determining the type of the image; and a threshold value control unit, coupled to the image information discriminating unit, outputting an instruction to set one of the first threshold value and the second threshold value based on the type.

12. A FAX input controller as claimed in claim 10, wherein the image information identifying unit comprises:

a line identifying unit determining a type of line input to the network control unit; and a threshold value control unit, coupled to the line identifying unit, outputting an instruction to set one of the first threshold value and the second threshold value based on the type.

13. A FAX input controller as claimed in claim 10, wherein the image information identifying unit comprises:

an ID recognizing unit detecting an ID included in the image information;

an image information discriminating unit, coupled to the ID recognizing unit, determining whether the image information includes character recognition information based on the ID and outputting the type of image information;

an ID table, coupled to the image information discriminating unit, storing the ID; and a threshold value control unit, coupled to the image information discriminating unit, outputting an instruction to set one of the first threshold value and the second threshold value based on the type.

14. A FAX input controller as claimed in claim 10, wherein the image information identifying unit comprises:

an ID recognizing unit detecting an ID included in the image information;

an image information discriminating unit, coupled to the ID recognizing unit, determining whether the image information includes character recognition information based on the ID and outputting the type of image information;

an identifying information recognizing unit, couple to the image information discriminating unit, detecting an identifying mark in the image information;

an ID table, coupled to the image information discriminating unit, storing the ID;

an ID registering unit, coupled to the image information discriminating unit and the ID table, registering the ID into the ID table if the ID is not registered in the ID table; and a threshold value control unit, coupled to the image information discriminating unit, outputting an instruction to set one of the first threshold value and the second threshold value based on the type.

15. A FAX input controller as claimed in claim 10, wherein the image information identifying unit comprises:

a clock unit outputting time;

an image information discriminating unit, coupled to the clock unit, determining whether the image information includes character recognition information based on the time and outputting the type of image information; and a threshold value control unit, coupled to the image information discriminating unit, outputting an instruction to set one of the first threshold value and the second threshold value based on the type.

16. A FAX-OCR apparatus comprising:

a FAX input controller, coupled to a communication line, controlling whether the FAX-OCR apparatus is disconnected from the communication line and checking errors in image information received from the communication line by determining whether the image information includes a number of errors exceeding one of a threshold value established by the FAX input controller based on a type of the image information received;

an image master file, coupled to the FAX input controller, accumulating the image information which completed error checking by the FAX input controller;

a character recognizing process controller, coupled to the image master file, and outputting an instruction;

a format parameter information file coupled to the character recognizing process controller and outputting results;

an optical character recognition unit, coupled to the character recognizing process controller, recognizing characters based on the instruction and the results;

a recognizing result data file, coupled to the character recognizing process controller, storing recognition results output by the character recognizing process controller;

a correction result data file, coupled to a terminal, accumulating a process result verified and modified by the terminal;

an image master file manager, coupled to the image master file, managing output of the image information accumulated in the image master file manager.

17. An apparatus, comprising:

a disconnecting unit disconnecting a transmission line from the apparatus based on a threshold number of errors, said threshold number of errors variable depending upon a type of information received over the transmission line;

a recognition unit recognizing characters included in the information.

18. An apparatus claimed in claim 17, wherein the disconnecting unit comprises a FAX input controller determining the type of information and controlling the transmission line.

19. The apparatus claimed in claim 17, wherein recognition unit recognizes the characters based on the type of the information.

20. An apparatus, comprising:

a disconnecting unit disconnecting a transmission line from the apparatus based on a number of errors and a type of information received over the transmission line, wherein the disconnecting unit comprises a FAX input controller deteremining the type of information and controlling the transmission line and wherein the FAX input controller compares a number of errors in the information to one of a first threshold and a second threshold based on the type of the image information received; and a recognition unit recognizing characters included in the information.

* * * * *

UNITED STATES PATENT AND TRADEMARK OFFICE
CERTIFICATE OF CORRECTION

PATENT : 6,057,942
DATED : May 2, 2000
INVENTOR(S) : Jun SATO

It is certified that error appears in the above-identified patent and that said Letters Patent is hereby corrected as shown below:

Col. 16, line 9, change "couple" to --coupled--.

Signed and Sealed this

Twentieth Day of March, 2001

Attest:

NICHOLAS P. GODICI

Attesting Officer

Acting Director of the United States Patent and Trademark Office